(12) United States Patent
Zhang et al.

(10) Patent No.: US 12,593,313 B2
(45) Date of Patent: Mar. 31, 2026

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Shichang Zhang, Guangdong (CN); Huei-Ming Lin, Taipei (TW); Zhenshan Zhao, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 314 days.

(21) Appl. No.: 18/506,735

(22) Filed: Nov. 10, 2023

(65) Prior Publication Data

US 2024/0080807 A1 Mar. 7, 2024

Related U.S. Application Data

(63) Continuation of application No. PCT/CN2021/093107, filed on May 11, 2021.

(51) Int. Cl.
*H04W 72/02* (2009.01)
*H04W 72/40* (2023.01)

(52) U.S. Cl.
CPC ........... *H04W 72/02* (2013.01); *H04W 72/40* (2023.01)

(58) Field of Classification Search
CPC .............................. H04W 72/02; H04W 72/40
See application file for complete search history.

(56) References Cited

U.S. PATENT DOCUMENTS

| | | | |
|---|---|---|---|
| 2021/0127364 A1 | 4/2021 | Panteleev et al. | |
| 2022/0322359 A1* | 10/2022 | Ye | H04W 72/02 |
| 2022/0346119 A1* | 10/2022 | Lu | H04L 5/0055 |
| 2023/0143979 A1 | 5/2023 | Luo et al. | |
| 2023/0389051 A1* | 11/2023 | Leon Calvo | H04W 72/25 |
| 2024/0073875 A1* | 2/2024 | Leon Calvo | H04W 72/25 |

FOREIGN PATENT DOCUMENTS

| | | |
|---|---|---|
| CA | 3119210 | 5/2020 |
| CN | 111565405 | 8/2020 |
| CN | 111901783 | 11/2020 |
| CN | 112423273 | 2/2021 |

OTHER PUBLICATIONS

"3rd Generation Partnership Project; Technical Specification Group Radio Access Network; NR; Radio Resource Control (RRC) protocol specification (Release 16)," 3GPP TS 38.331, Jan. 2021, v16.3.1.

(Continued)

*Primary Examiner* — Won Tae C Kim
(74) *Attorney, Agent, or Firm* — Hodgson Russ LLP

(57) ABSTRACT

A wireless communication method and a terminal device are provided. A first terminal device sends first information to a second terminal device, where the first information indicates that the second terminal device is to provide a first resource set, and the first resource set is used for the first terminal device to select a transmission resource.

16 Claims, 9 Drawing Sheets

200

(56) References Cited

OTHER PUBLICATIONS

"3rd Generation Partnership Project; Technical Specification Group Radio Access Network; NR; Physical layer procedures for data (Release 16)," 3GPP TS 38.214, Mar. 2021, v16.5.0.

"3rd Generation Partnership Project; Technical Specification Group Radio Access Network; NR; Medium Access Control (MAC) protocol specification (Release 16)," 3GPP TS 38.321, Sep. 2020, v16.2.1.

OPPO, "Inter-UE coordination in mode 2 of NR sidelink," 3GPP TSG RAN WG1 #104-e, R1-2100142, Jan. 2021.

CMCC, "Discussion on reliability and latency enhancements for mode-2 resource allocation," 3GPP TSG RAN WG1 #103-e, R1-2008032, Oct. 2020.

Fujitsu, "Considerations on Inter-UE Coordination for Mode 2 Enhancements," 3GPP TSG RAN WG1 Meeting #104-e, R1-2100746, Jan. 2021.

WIPO, International Search Report and Written Opinion for International Application No. PCT/CN2021/093107, Feb. 10, 2022.

EPO, Extended European Search Report for EP Application No. 21941271.5, Mar. 18, 2024.

EPO, Communication for EP Application No. 21941271.5, Jan. 22, 2025.

\* cited by examiner 131　　132

SL

BASE STATION

SL
COMMUNICATION

BASE STATION

SL COMMUNICATION

BASE STATION

SL COMMUNICATION

WIRELESS COMMUNICATION METHOD AND TERMINAL DEVICE

CROSS-REFERENCE TO RELATED APPLICATION(S)

This application is a continuation of International Application No. PCT/CN2021/093107, filed May 11, 2021, the entire disclosure of which is incorporated herein by reference.

TECHNICAL FIELD

Embodiments of the disclosure relate to the field of communication, and more particularly, to a wireless communication method and a terminal device.

BACKGROUND

In a new radio vehicle to everything (NR-V2X) system, a terminal device may select a transmission resource randomly from a resource pool, or may select a transmission resource from a resource pool according to a sensing result. With such resource selection mode, it is possible to avoid interference between terminals to some extent. However, if the above resource selection mode is adopted, it will also result in problems such as hidden node, half duplex, and exposed node. How to optimize the resource selection mode described above so as to avoid occurrence of hidden node, half duplex, and exposed node during resource selection is a problem to be solved.

SUMMARY

In a first aspect, a wireless communication method is provided. The method includes the following. A first terminal device sends first information to a second terminal device, where the first information indicates that the second terminal device is to provide a first resource set, and the first resource set is used for the first terminal device to select a transmission resource. The first terminal device receives the first resource set sent by the second terminal device. The first terminal device selects based on the first resource set, a resource for transmission of data on a target logical channel.

In a second aspect, a wireless communication method is provided. The method includes the following. A second terminal device receives first information sent by a first terminal device, where the first information indicates that the second terminal device is to provide a first resource set, and the first resource set is used for the first terminal device to select a transmission resource.

In a third aspect, a terminal device is provided. The terminal device includes a processor and a memory. The memory is configured to store computer programs. The processor is configured to invoke and execute the computer programs stored in the memory, so as to perform the method in the first aspect.

DETAILED DESCRIPTION

Figure 1:
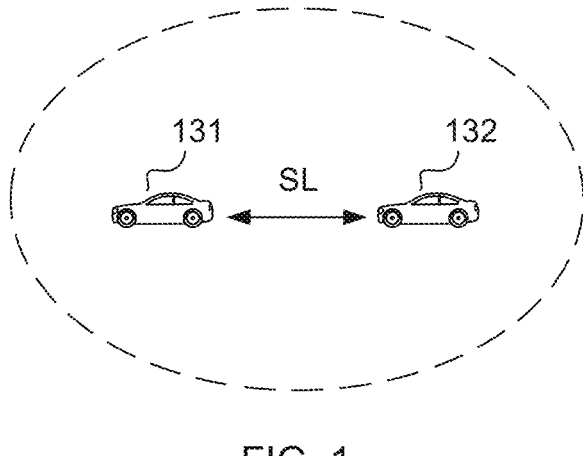
FIG. 1 is a schematic architectural diagram of a communication system to which embodiments of the disclosure are applied.

The following will describe technical solutions of embodiments of the disclosure with reference to the accompanying drawings in embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

Embodiments of the disclosure provide a wireless communication method and a terminal device. As such, it is possible to avoid occurrence of problems such as hidden node, half duplex, exposed node, etc. during resource selection, thereby improving reliability of resource selection.

Embodiments of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a 5th-generation (5G) communication systems, or other communication systems, etc.

Generally speaking, a conventional communication system generally supports a limited quantity of connections and therefore is easy to implement. However, with development of communication technology, a mobile communication system will not only support conventional communication but also support, for example, device to device (D2D)

communication, machine to machine (M2M) communication, machine type communication (MTC), vehicle to vehicle (V2V) communication, or vehicle to everything (V2X) communication, etc. Embodiments of the disclosure can also be applied to these communication systems.

Optionally, the communication system in embodiments of the disclosure may be applied to a carrier aggregation (CA) scenario, or may be applied to a dual connectivity (DC) scenario, or may be applied to a standalone (SA) network deployment scenario.

Optionally, the communication system in embodiments of the disclosure is applicable to an unlicensed spectrum, and an unlicensed spectrum may be regarded as a shared spectrum. Or the communication system in embodiments of the disclosure is applicable to a licensed spectrum, and a licensed spectrum may be regarded as a non-shared spectrum.

Various embodiments of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc.

The terminal device may be a station (ST) in a WLAN, a cellular radio telephone, a cordless telephone, a session initiation protocol (SIP) telephone, a wireless local loop (WLL) station, a personal digital assistant (PDA), a handheld device or a computing device with wireless communication functions, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

In embodiments of the disclosure, the terminal device may be deployed on land, which includes indoor or outdoor, handheld, wearable, or in-vehicle. The terminal device may also be deployed on water (such as ships, etc.). The terminal device may also be deployed in the air (such as airplanes, balloons, satellites, etc.).

In embodiments of the disclosure, the terminal device may be a mobile phone, a pad, a computer with wireless transceiver functions, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

By way of explanation rather than limitation, in embodiments of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In embodiments of the disclosure, the network device may be a device configured to communicate with a mobile device, and the network device may be an access point (AP) in a WLAN, a base transceiver station (BTS) in GSM or CDMA, may also be a Node B (NB) in WCDMA, or may be an evolutional Node B (eNB or eNodeB) in LTE, or a relay station or AP, or an in-vehicle device, a wearable device, a network device or base station (gNB) in an NR network, a network device in a future evolved PLMN, or a network device in an NTN, etc.

By way of explanation rather than limitation, in embodiments of the disclosure, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station deployed on land or water.

In embodiments of the disclosure, the network device serves a cell, and the terminal device communicates with the network device on a transmission resource (for example, a frequency-domain resource or a spectrum resource) for the cell. The cell may be a cell corresponding to the network device (for example, a base station). The cell may belong to a macro base station, or may belong to a base station corresponding to a small cell. The small cell may include: a metro cell, a micro cell, a pico cell, a femto cell, and the like. These small cells are characterized by small coverage and low transmission power and are adapted to provide data transmission service with high-rate.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "1" herein generally indicates that the associated objects are in an "or" relationship.

Terms used in the implementation part of the disclosure are only intended for explaining embodiments of the disclosure rather than limiting the disclosure. The terms "first", "second", "third", and "fourth", etc. in the specification and claims of the disclosure and in the accompanying drawings are intended for distinguishing different objects rather than describing a particular order. In addition, the terms "include", "comprise", and "have" as well as variations thereof are intended to cover non-exclusive inclusion.

It should be understood that, "indication" referred to in embodiments of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that that there is an association relationship between A and B.

In the elaboration of embodiments of the disclosure, the term "correspondence" may mean that there is a direct or indirect correspondence between the two, may mean that there is an association between the two, or may mean a relationship of indicating and indicated or configuring and configured, etc.

In embodiments of the disclosure, the "pre-defined" or "pre-configured" can be implemented by pre-saving a corresponding code or table in a device (for example, including the terminal device and the network device) or in other manners that can be used for indicating related information, and the disclosure is not limited in this regard. For example, the "pre-defined" may mean defined in a protocol.

In embodiments of the disclosure, the "protocol" may refer to a communication standard protocol, which may include, for example, an LTE protocol, an NR protocol, and a protocol applied to a future communication system, and the disclosure is not limited in this regard.

FIG. 1 is a schematic diagram of a communication system to which embodiments of the disclosure are applicable. An in-vehicle terminal (in-vehicle terminal 131 and in-vehicle terminal 132) autonomously selects, from sidelink (SL) resources, a transmission resource for data transmission. Optionally, the in-vehicle terminal may select a transmission resource randomly, or may select a transmission resource through sensing.

Figure 2:
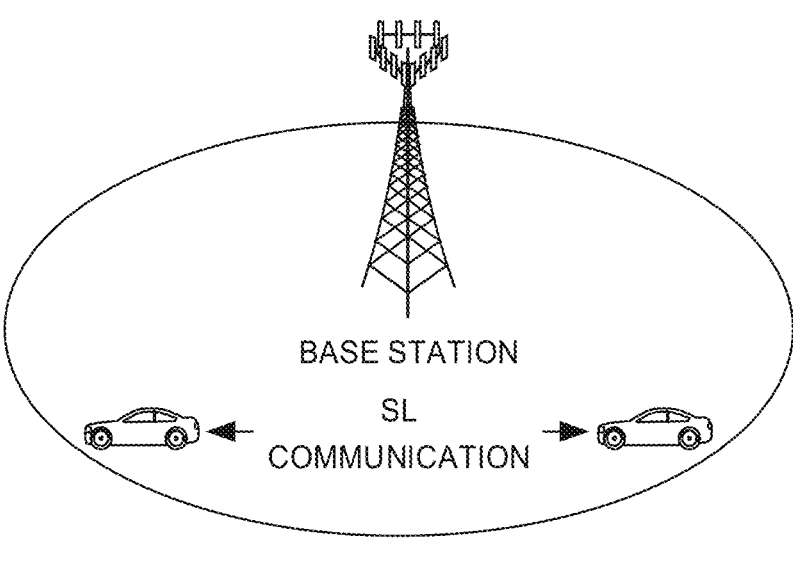
FIG. 2 is a schematic diagram illustrating in-coverage sidelink (SL) communication provided in the disclosure.
Figure 3:
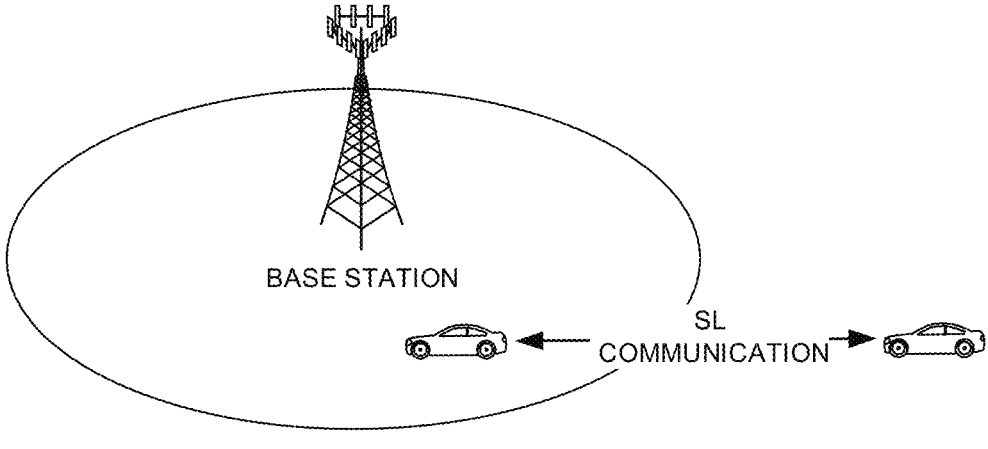
FIG. 3 is a schematic diagram illustrating partial-coverage SL communication provided in the disclosure.
Figure 4:
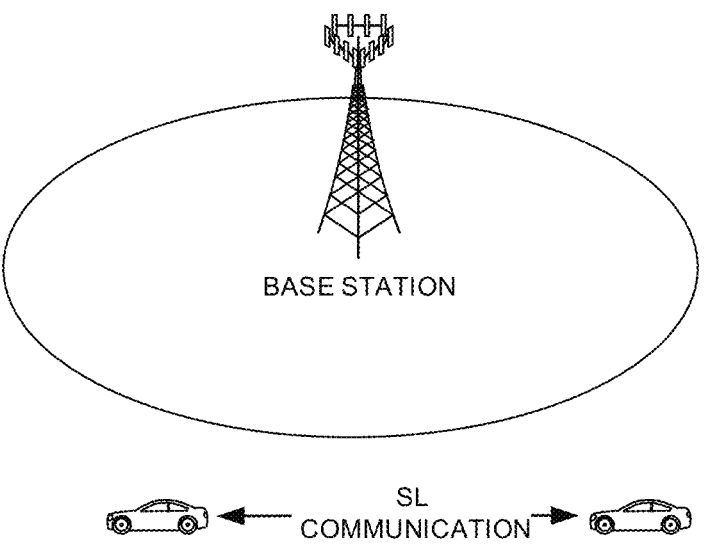
FIG. 4 is a schematic diagram illustrating out-of-coverage SL communication provided in the disclosure.

In some embodiments, according to a network coverage condition of terminals in communication, SL communication may be classified into in-coverage SL communication as illustrated in FIG. 2, partial-coverage SL communication as illustrated in FIG. 3, and out-of-coverage SL communication as illustrated in FIG. 4.

As illustrated in FIG. 2, in in-coverage SL communication, all terminals performing SL communication are located within a coverage of the same base station, so that all the terminals can perform SL communication based on the same SL configuration by receiving configuration signaling from the base station.

As illustrated in FIG. 3, in partial-coverage SL communication, some of terminals performing SL communication are located within the coverage of the base station, and these terminals can receive configuration signaling from the base station and perform SL communication based on a configuration of the base station. However, a terminal(s) located out of the coverage of the network cannot receive the configuration signaling from the base station. In this case, the terminal(s) out of the coverage of the network will determine an SL configuration according to pre-configuration information as well as information carried in a physical sidelink broadcast channel (PSBCH) sent by the terminal(s) located within the coverage of the network, thereby performing SL communication.

As illustrated in FIG. 4, in out-of-coverage SL communication, all terminals in SL communication are located out of the coverage of the network, and all the terminals determine an SL configuration according to pre-configuration information, thereby performing SL communication.

In order for better understanding of embodiments of the disclosure, a resource selection mode related to the disclosure will be described in detail.

D2D communication is a D2D SL transmission technology. Compared with a traditional cellular system in which communication data is received or transmitted by a base station, D2D communication has higher spectral efficiency and lower transmission delay. In a V2X system, D2D direct communication is adopted. In the 3rd generation partnership project (3GPP), two transmission modes are defined, which are referred to as Mode 1 and Mode 2 respectively. Embodiments of the disclosure can be applied to Mode 2.

Mode 1: a transmission resource for a terminal is allocated by a base station, and the terminal performs data transmission on an SL on the resource allocated by the base station. The base station may allocate to the terminal a resource for single transmission, or may allocate to the terminal a resource for semi-persistent transmission. As illustrated in FIG. 2, the terminal is located within a coverage of a network, and the network allocates to the terminal a transmission resource used for SL transmission.

Mode 2: the terminal selects a resource for data transmission from a resource pool. As illustrated in FIG. 4, the terminal is located out of a coverage of a cell, and the terminal autonomously selects a transmission resource for SL transmission from a pre-configured resource pool. Alternatively, as illustrated in FIG. 2, the terminal autonomously selects a transmission resource for SL transmission from a resource pool configured by a network.

In NR-V2X, the UE may operate in a mixed mode, that is, may obtain a resource in Mode 1 or in Mode 2.

Resource selection in Mode 2 may be performed in the following two steps.

Step 1, the terminal takes all available resources in a resource selection window as resource set A.

If the terminal performs data transmission in some slots in a sensing window without sensing, the terminal will exclude all resources in slots in the selection window which correspond to these slots in the sensing window. The terminal determines the corresponding slots in the selection window based on a value set of a 'resource reservation period' field in a resource pool configuration.

If a physical sidelink control channel (PSCCH) is sensed by the terminal in the sensing window, the terminal will measure a reference signal received power (RSRP) of the PSCCH or an RSRP of a physical sidelink shared channel (PSSCH) scheduled by the PSCCH. If the measured RSRP is greater than an SL RSRP threshold, and it is determined, according to resource reservation information in sidelink control information (SCI) transmitted on the PSCCH, that a resource reserved is within the resource selection window, the terminal will exclude the corresponding resource from resource set A. If resources remaining in resource set A is less than X % of all the resources in resource set A before resource exclusion, the terminal will increase the SL RSRP threshold by 3 decibels (dB) and repeat step 1. The possible value of X is {20, 35, 50}, and the terminal determines parameter X from the value set according to a priority of data to be transmitted. In addition, the SL RSRP threshold depends on a priority carried in the PSCCH sensed by the terminal and the priority of the data to be transmitted by the terminal. The terminal takes the remaining resources in resource set A after resource exclusion as a candidate resource set.

Step 2, the terminal selects some resources randomly from the candidate resource set, and takes these resources as transmission resources for initial transmission and retransmission(s) of the terminal.

In order for better understanding of embodiments of the disclosure, resource selection in Mode 2 related to the disclosure will be described in detail.

Figure 5:
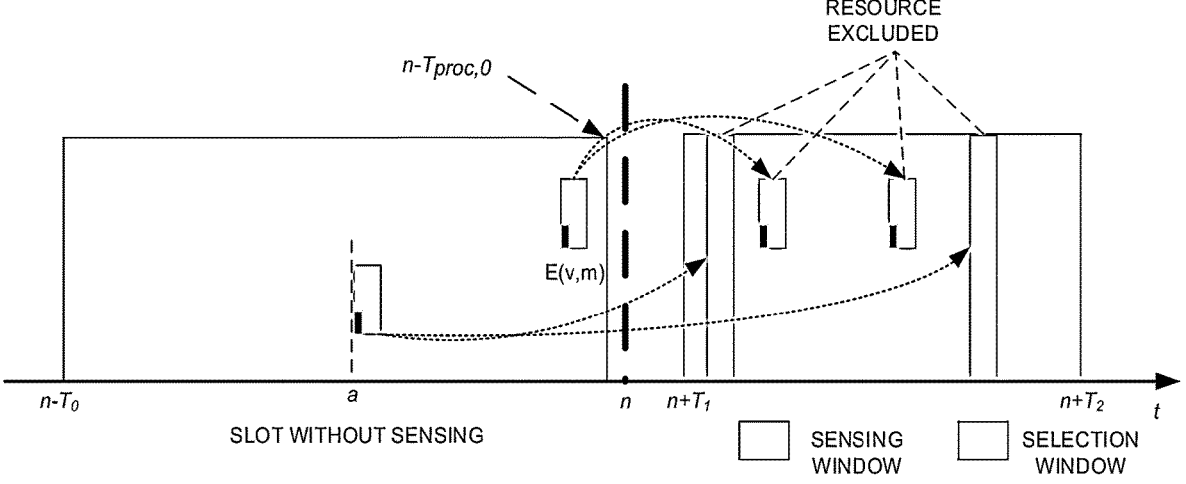
FIG. 5 is a schematic diagram illustrating resource selection in Mode 2 provided in the disclosure.

As illustrated in FIG. 5, a terminal triggers resource selection or reselection in slot n, and a resource selection window starts at n+T1 and ends at n+T2. $0<=T1<=T_{proc,1}$. If sub-carrier spacing (SCS)=15, 30, 60, 120 kilohertz (kHz), $T_{proc,1}$=3, 5, 9, 17 slots. $T2_{min}<=T2<=$remaining delay budget of service, and a value set of $T2_{min}$ is $\{1, 5, 10, 20\}*2^\mu$ slots, where p=0, 1, 2, 3 refers to SCS=15, 30, 60, 120 kHz respectively. The terminal determines $T2_{min}$ from the value set according to a priority of the data to be transmitted by the terminal. [n+T1, n+T2] is referred to as the resource selection window.

The terminal performs resource sensing from n−T0 to n−T$_{proc,0}$, where the value of T0 is 100 milliseconds or 1100 milliseconds. If SCS=15, 30, 60, 120 kHz, T$_{proc,0}$=1, 1, 2, 4 slots. [n−T0, n−T$_{proc,0}$] is referred to as a resource sensing window.

Resource selection in Mode 2 is performed in the following two steps.

Step 1, a physical layer of the terminal excludes, according to a channel sensing result, a resource not for SL transmission from a resource selection window.

The terminal takes all available resources that belong to a resource pool used by the terminal in the resource selection window as resource set A. Any one resource in resource set A is denoted by R(x, y), where x indicates a frequency-domain location of the resource and y indicates a time-domain location of the resource. The initial number of resources in resource set A is denoted by M$_{total}$.

Step 1-1, if the terminal performs data transmission in slot a in a sensing window without sensing, the terminal will determine whether slot a+q*Prxlg overlaps with resource R(x, y+j*Ptxlg). If slot a+q*Prxlg overlaps with resource R(x, y+j*Ptxlg), resource R(x, y) will be excluded from resource set A. j=0, 1, 2, 3 . . . , C−1, where C is determined according to a random counter value generated by the terminal. Ptxlg is the number of logical slots that are converted from resource reservation period Ptx for the terminal. Ptxlg is the number after Prx is converted into logical slots, where Prx is any one resource reservation period allowed in the resource pool. If Prx<Tscal and n−m<=Prxlg, Q=⌈Tscall/Prx⌉; and otherwise, Q=1. Tscal is equal to a value after T2 is converted into milliseconds.

Step 1-2, if a first SCI transmitted on a PSCCH is sensed by the terminal on a v$^{th}$ frequency-domain resource E(v, m) in slot m in the sensing window, the terminal will measure an SL RSRP of the PSCCH or an SL RSRP of a PSSCH scheduled by the PSCCH (that is, an SL RSRP of a corresponding PSSCH transmitted in the same slot as the PSCCH). If the measured SL RSRP is greater than an SL RSRP threshold and resource reservation between transport blocks (TBs) is activated in the resource pool used by the terminal, the terminal will suppose that a first SCI of the same content is received in slot m+q*Prxlg, where q=1, 2, 3 . . . , Q. If Prx<Tscal and n−m<Prxlg, Q=⌈Tscall/Prx⌉; and otherwise, Q=1. Tscal is equal to a value after T2 is converted into milliseconds. Ptxlg is the number after Prx is converted into logical slots, where Prx is a resource reservation period indicated by a 'resource reservation period' field of the first SCI transmitted on the PSCCH sensed by the terminal. The terminal determines whether a resource indicated by a 'time resource assignment' field and a 'frequency resource assignment' field of the first SCI received in slot m and Q first SCIs supposed to be received overlaps with resource R(x, y+j*Ptxlg). If the resource indicated by these first SCIs overlaps with resource R(x, y+j*Ptxlg), the terminal will exclude corresponding resource R(x, y) from set A. j=0, 1, 2, 3 . . . , C−1, where C is determined according to a random counter value generated by the terminal. Ptxlg is the number after Ptx is converted into logical slots, where Ptx is a resource reservation period determined by the terminal performing resource selection.

The RSRP threshold is determined according to priority P1 carried in the PSCCH sensed by the terminal and priority P2 of data to be transmitted by the terminal. A configuration of the resource pool used by the terminal contains an SL RSRP threshold list, where the SL RSRP threshold list contains SL RSRP thresholds corresponding to all priority combinations. The configuration of the resource pool may be configured by a network or may be pre-configured. If the number of remaining resources in resource set A is less than M$_{total}$*X % after resources exclusion, the SL RSRP threshold will be increased by 3 dB, and step 1 will be repeated. The possible value of X is {20, 35, 50}. The configuration of the resource pool used by the terminal contains a correspondence between priorities and possible values of X. The terminal determines the value of X according to the priority of the data to be transmitted and the correspondence.

A physical layer of the terminal takes resource set A after resource exclusion as a candidate resource set, and reports the candidate resource set to a higher layer, i. e., a media access control (MAC) layer of the terminal.

Step 2, the MAC layer of the terminal randomly selects a resource from the reported candidate resource set to perform data transmission, that is, the terminal selects a resource randomly from the candidate resource set to perform data transmission.

In order for better understanding of embodiments of the disclosure, a transmission mode in NR-V2X related to the disclosure will be described in detail.

In NR-V2X, automatic driving is supported, and therefore, NR-V2X has higher requirements on data communication between vehicles, such as higher throughput, lower delay, higher reliability, larger coverage, more flexible resource allocation, and the like.

Figure 6:
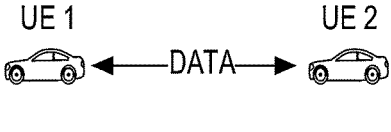
FIG. 6 is a schematic diagram illustrating unicast SL communication provided in the disclosure.
Figure 7:
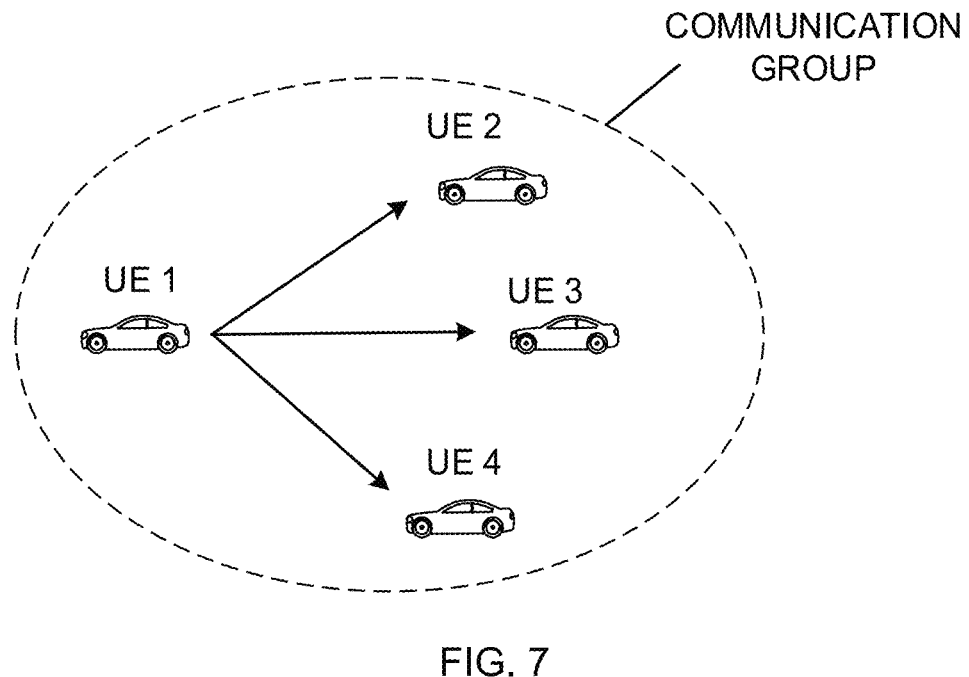
FIG. 7 is a schematic diagram illustrating multicast SL communication provided in the disclosure.
Figure 8:
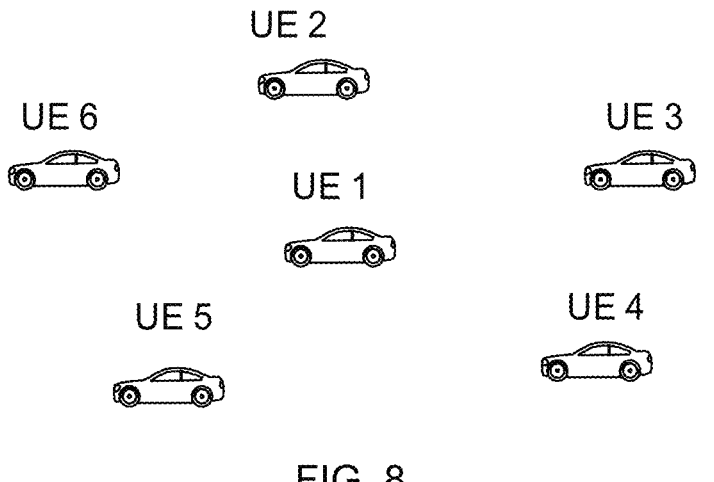
FIG. 8 is a schematic diagram illustrating broadcast SL communication provided in the disclosure.

In LTE-V2X, a broadcast mode is supported. In NR-V2X, a unicast mode and a multicast mode are introduced. In unicast transmission, a receiving-end terminal is only one terminal. As illustrated in FIG. 6, UE 1 and UE 2 perform unicast transmission with each other. In multicast transmission, a receiving end includes all terminals in a communication group or all terminals within a certain transmission distance. As illustrated in FIG. 7, UE 1, UE 2, UE 3, and UE 4 constitute a communication group, where UE 1 transmits data, and other terminal devices in the group are all receiving-end terminals. In the broadcast mode, a receiving end is any terminal around a transmitting-end terminal. As illustrated in FIG. 8, UE 1 is a transmitting-end terminal, and other terminals, i. e. UE 2~UE 6, around UE 1 are all receiving-end terminals.

In an SL transmission system, a resource pool is introduced. The resource pool is a set of transmission resources. No matter whether the transmission resource is a transmission resource configured by a network or is a transmission resource autonomously selected by a terminal, the transmission resource is a resource in the resource pool. The resource pool may be pre-configured or may be configured by a network, and one or more resource pools may be configured. The resource pool is classified into a transmission resource pool and a receiving resource pool. The transmission resource pool means that a transmission resource in the resource pool is used for SL data transmission. The receiving resource pool means that the terminal receives SL data on a transmission resource in the resource pool.

In order for better understanding of embodiments of the disclosure, enhanced resource allocation in NR-V2X related to the disclosure will be described in detail.

In Mode 2 described above, a terminal device selects a transmission resource randomly from a resource pool, or selects a transmission resource according to a sensing result. In such resource selection mode, it is possible to avoid interference between terminals to some extent, but such resource selection mode has the following problems.

Figure 9:
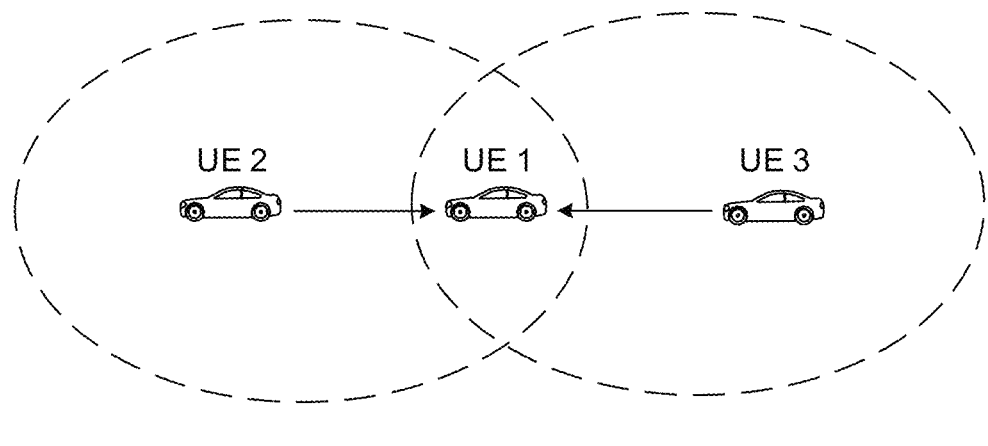
FIG. 9 is a schematic diagram illustrating hidden node provided in the disclosure.

1. Hidden node: as illustrated in FIG. 9, UE 2 selects a resource through sensing, and transmits SL data to UE 1 on the resource. Because UE 2 and UE 3 are far from each other and cannot sense transmission of each other, if the same transmission resource is selected by UE 2 and UE 3, data transmitted by UE 3 may cause interference to data transmitted by UE 2. This is a hidden-node problem.

2. Half duplex: when selecting a transmission resource through sensing, in a sensing window, if a terminal transmits SL data in a certain slot, the terminal cannot receive in the slot data transmitted by other terminals due to restriction of half duplex and thus has no sensing result, and the terminal will exclude all resources corresponding to the slot in a selection window when performing resource exclusion, so as to avoid interference with other terminals. Due to restriction of half duplex, many resources are unnecessarily excluded by the terminal. In addition, if the terminal transmits data in the slot and another terminal also selects the same resource in the slot and transmits data, due to restriction of half duplex, the two terminals will be unable to determine that there is resource collision, which will lead to consistent resource collision between the two terminals.

Figure 10:
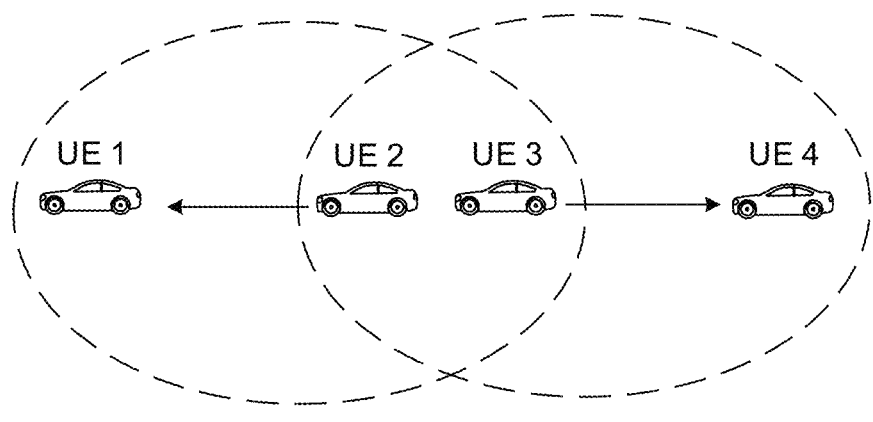
FIG. 10 is a schematic diagram illustrating exposed node provided in the disclosure.

3. Exposed node: as illustrated in FIG. 10, transmitting UE 2 and transmitting UE 3 can sense each other, but target receiving UE 1 of transmitting UE 2 is far from transmitting UE 3, and target receiving UE 4 of transmitting UE 3 is far from transmitting UE 2. In this case, even though the same time-frequency resource is used by transmitting UE 2 and transmitting UE 3, reception of the target receiving terminal of transmitting UE 2 and reception of the target receiving terminal of transmitting UE 3 will not be affected. However, since transmitting UE 2 and transmitting UE 3 are close to each other in geographic location, a signal received power detected by each other during sensing may be very high, and as a result, transmitting UE 2 and transmitting UE 3 may select an orthogonal time-frequency resource, which may degrade resource utilization efficiency.

4. Power consumption: in the above sensing procedure, the terminal needs to perform resource sensing consistently, so as to determine which resources are available. However, consistent resource sensing of the terminal will cause high power consumption. This does not matter for an in-vehicle terminal because the in-vehicle terminal is equipped with a power supply device. However, for a handheld terminal, excessive power consumption will result in power-off of the terminal soon. Therefore, how to reduce power consumption of the terminal is also a problem that needs to be taken into consideration in resource selection.

Based on the problems described above, the disclosure provides a resource selection scheme. A first terminal device indicates that a second terminal device is to provide a first resource set, so that the first terminal device can select a transmission resource based on the first resource set, which is possible to avoid occurrence of problems such as hidden node, half duplex, exposed node, etc. during resource selection, thereby improving reliability of resource selection.

Technical solutions of the disclosure will be hereinafter described in detail with reference to embodiments.

Figure 11:
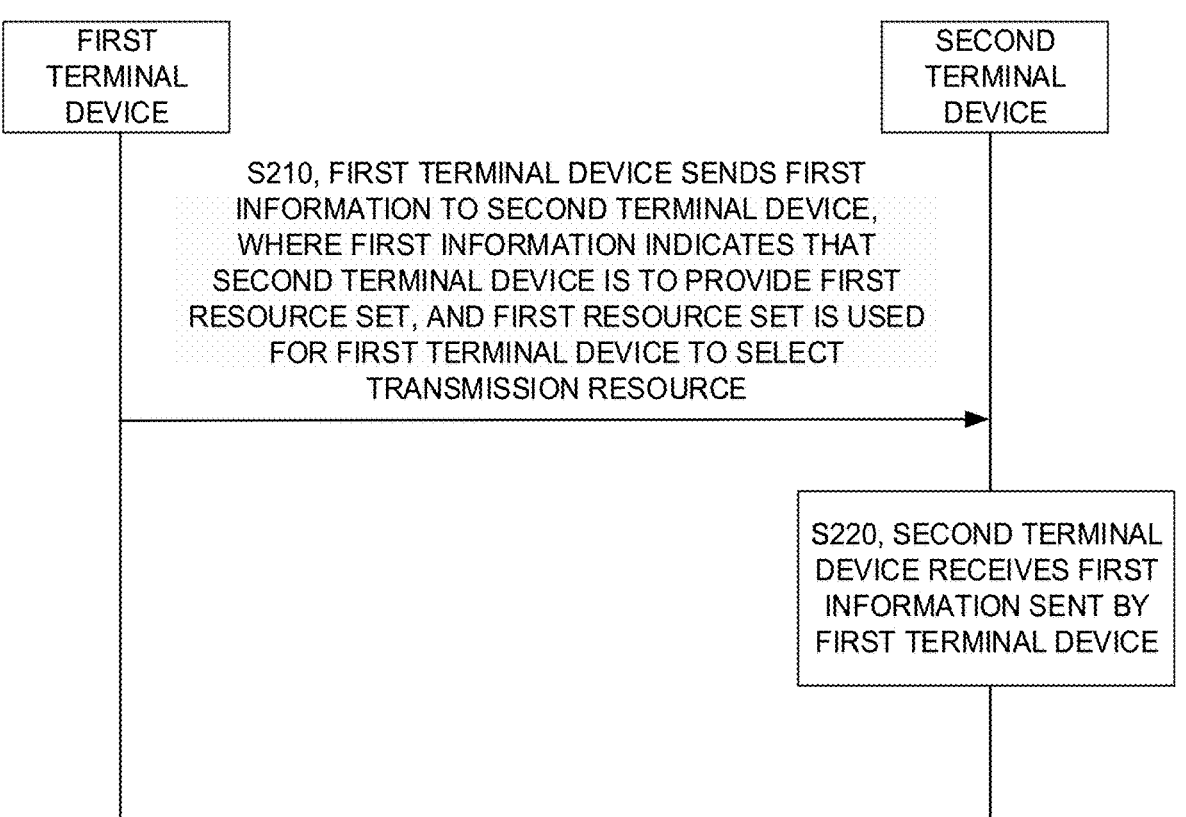
FIG. 11 is a schematic interaction flowchart of a wireless communication method provided in embodiments of the disclosure.

FIG. 11 is a schematic flowchart of a wireless communication method 200 according to embodiments of the disclosure. As illustrated in FIG. 11, the method 200 may include at least some of the following.

S210, a first terminal device sends first information to a second terminal device, where the first information indicates that the second terminal device is to provide a first resource set, and the first resource set is used for the first terminal device to select a transmission resource.

S220, the second terminal device receives the first information sent by the first terminal device.

In embodiments of the disclosure, the first terminal device indicates that the second terminal device is to provide the first resource set, and the first terminal device can select a transmission resource based on the first resource set, that is, the first resource set can assist the first terminal device in resource selection. Specifically, a resource in the first resource set may an available resource obtained by the second terminal device according to a resource sensing result, a base-station indication, etc., or may be determined according to an SCI detected.

With the technical solution, the first terminal device indicates that the second terminal device is to provide the first resource set, so that the first terminal device can select a transmission resource based on the first resource set, which can avoid occurrence of problems such as hidden node, half duplex, exposed node, etc. during resource selection, thereby improving reliability of resource selection.

In some embodiments, the first resource set may be a resource set for the first terminal device. When selecting a resource for transmitting SL data to a target receiving terminal, the first terminal device may select a resource preferentially from the first resource set, thereby improving reliability in reception of the SL data by the target receiving terminal.

In some embodiments, the first resource set may also be a resource set that is not for the first terminal device. During resource selection, the first terminal device avoids selecting a resource from the first resource set, thereby avoiding occurrence of problems such as hidden terminal and half duplex. In other words, the second terminal device may send to the first terminal device transmission resources that may cause resource collision or a half-duplex problem or cause collision in physical sidelink feedback channel (PSFCH) transmission and reception, such that the first terminal device avoids selecting these transmission resources, thereby avoiding a half-duplex problem, a hidden-node problem, etc.

Compared with autonomous selection of the transmission resource by the terminal in Mode 2, in embodiments of the disclosure, during resource selection, the terminal selects a resource based on a resource set sent by other terminals, thereby improving reliability of transmission.

In some embodiments, S210 may specifically include the following. If a preset condition is satisfied, the first terminal device sends the first information to the second terminal device.

In some embodiments, the preset condition includes, but is not limited to, at least one of: an SL pathloss between the first terminal device and the second terminal device is less than a first threshold, a distance between the first terminal device and the second terminal device is less than a second threshold, the first terminal device and the second terminal device are located in the same zone or adjacent zones, a resource pool used by the first terminal device allows random resource selection, the first terminal device is performing random resource selection or partial sensing-based resource selection, or the first terminal device does not have a channel sensing result when resource reselection is triggered.

For example, the first terminal device may send the first information to the second terminal device if the SL pathloss is less than the first threshold and the first terminal device is performing random resource selection.

For another example, the first terminal device may send the first information to the second terminal device when: the SL pathloss is less than the first threshold, the first terminal device is performing partial sensing-based resource selection, and the resource pool currently used allows random resource selection.

For another example, if the first terminal device is performing random resource selection, the first terminal device will send the first information to the second terminal device. Alternatively, if the first terminal device does not have a channel sensing result when resource reselection is triggered, that is, the first terminal device cannot select a resource according to a previous channel sensing result, the first terminal device will send the first information to the second terminal device.

In some embodiments, the SL pathloss is determined according to an SL RSRP of the first terminal device measured and reported by the second terminal device.

In some embodiments, the first threshold is pre-configured or specified in a protocol, or the first threshold is configured by a network device, or the first threshold is determined by the first terminal device.

In some embodiments, the second threshold is pre-configured or specified in a protocol, or the second threshold is configured by a network device, or the second threshold is determined by the first terminal device.

In some embodiments, the size of the zone is pre-configured or specified in a protocol, or the size of the zone is configured by a network device.

In some embodiments, the preset condition is pre-configured or specified in a protocol, or the preset condition is configured by a network device.

In embodiments of the disclosure, if the preset condition is satisfied, the first terminal device can indicate that the second terminal device is to provide the first resource set. By introducing the preset condition, it is possible to ensure validity of a sensing result of the second terminal device and conducive to reliability of the first resource set provided by the second terminal device.

In some embodiments, the first information includes, but is not limited to, at least one of: a percentage of remaining resources, a physical-layer priority (L1 priority) of data to be transmitted by the first terminal device, a remaining tolerable delay of the data to be transmitted by the first terminal device, a resource reservation interval for the data to be transmitted by the first terminal device, or a frequency-domain size of a transmission resource for the first terminal device.

In some embodiments, the frequency-domain size of the transmission resource for the first terminal device may be represented by the number of physical resource blocks (PRBs).

In some embodiments, the first information includes indication information, and the indication information indicates whether the first terminal device is to select a transmission resource from the first resource set.

For example, the indication information indicates that the first terminal device is to select a transmission resource from the first resource set. In this case, the first resource set is a resource set for the first terminal device.

For another example, the indication information indicates that the first terminal device is not to select a transmission resource from the first resource set. In this case, the first resource set is a resource set that is not for the first terminal device.

In some embodiments, the first terminal device receives the first resource set sent by the second terminal device, and the first terminal device selects, based on the first resource set, a resource for transmission of data on a target logical channel.

In some implementations, the target logical channel may be a current logical channel, or may be other logical channels, and the disclosure is not limited in this regard.

Example 1: the first terminal device at least selects, from the first resource set, a resource for initial transmission of the data on the target logical channel. Then the first terminal device selects, from the first resource set as much as possible, a resource for a hybrid automatic repeat request (HARQ) retransmission(s) of the data on the target logical channel.

In example 1, the first resource set is a resource set for the first terminal device.

In some implementations of example 1, the first terminal device selects, from the first resource set, a resource for initial transmission of the data on the target logical channel.

In some implementations of example 1, the first terminal device selects, from the first resource set, N+1 resources for transmission of the data on the target logical channel, where N is a positive integer. The N+1 resources include a resource for initial transmission of the data on the target logical channel and a resource for N HARQ retransmissions of the data on the target logical channel.

In some implementations, the N HARQ retransmissions may be a total number of HARQ retransmissions of the data on the target logical channel, or may be some of the HARQ retransmissions of the data on the target logical channel.

In some implementations, any one of the N+1 resources can be indicated by a prior SCI.

For example, resource 1 in the N+1 resources can be indicated by one or more SCIs transmitted prior to resource 1.

For another example, resource 2 in the N+1 resources can be indicated by one or more SCIs transmitted prior to resource 2.

In some implementations, an interval between any two adjacent resources in the N+1 resources is not less than a first interval.

In some implementations, if a PSFCH resource is configured for a resource pool or if the first terminal device is to transmit an activated HARQ-acknowledgement (HARQ-ACK) feedback, an interval between any two adjacent resources in the N+1 resources is not smaller than a first interval.

In some implementations, the first interval is pre-configured or specified in a protocol, or the first interval is configured by a network device, or the first interval is determined by the first terminal device.

In some implementations of example 1, if at least one of the N+1 resources selected from the first resource set cannot be indicated by a prior SCI, the first terminal device selects N+1 resources from resources which are before a remaining delay requirement corresponding to the data on the target logical channel. The N+1 resources include a resource for initial transmission of the data on the target logical channel and a resource for N HARQ retransmissions of the data on the target logical channel, where N is a positive integer.

In some implementations of example 1, the first terminal device does not perform any channel sensing after sending the first information. After receiving the first resource set sent by the second terminal device, the first terminal device firstly selects a time-frequency resource (namely, a resource for initial transmission of the data on the target logical channel) randomly from the first resource set sent by the second terminal device. If N HARQ retransmissions are needed for the data on the target logical channel (where N is a positive integer and N≥1) and there are additional resources in the first resource set, the first terminal device further selects N additional resources from the first resource set. The first terminal device should ensure that any one of the N+1 resources selected can be indicated by a prior SCI. In addition, if a PSFCH resource is configured for a resource pool or if the first terminal device is to transmit an activated HARQ-ACK feedback, an interval between any two adjacent resources in the N+1 resources should be not less than the first interval, so as to ensure PSFCH feedback and PSFCH feedback-based retransmission. If the first terminal device cannot ensure that any one of the N+1 resources selected from the first resource set can be indicated by the prior SCI, the first terminal device selects N+1 resources randomly from resources which are before the remaining delay requirement corresponding to the data on the target logical channel, as illustrated in FIG. 12.

Figure 12:
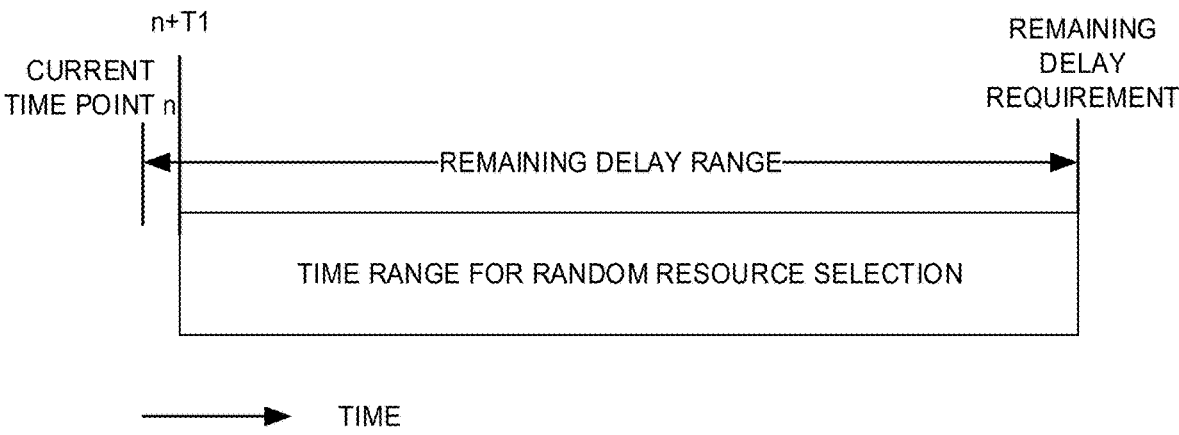
FIG. 12 is a schematic diagram illustrating a remaining delay requirement provided in embodiments of the disclosure.

It should be noted that, as illustrated in FIG. 12, the remaining delay requirement is determined based on the data on the target logical channel. $0 <= T1 <= T_{proc,1}$. If SCS=15, 30, 60, 120 kHz, $T_{proc,1}$=3, 5, 9, 17 slots.

In embodiments of the disclosure, the "remaining delay requirement" may also be referred to as "remaining delay budget", and the two are interchangeable.

Example 2: the first terminal device determines a second resource set through partial sensing, excludes a resource in the first resource set from the second resource set, and then selects, from the second resource set, a resource for transmission of the data on the target logical channel.

In example 2, the first resource set is a resource set that is not for the first terminal device.

In some implementations of example 2, the first terminal device determines the second resource set according to a partial sensing result. Then the first terminal device selects, from resources in the second resource set other than resources in the first resource set, a resource for initial transmission of the data on the target logical channel.

In some implementations of example 2, the first terminal device determines the second resource set according to a partial sensing result. Then the first terminal device selects, from resources in the second resource set other than resources in the first resource set, N+1 resources for transmission of the data on the target logical channel. The N+1 resources include a resource for initial transmission of the data on the target logical channel and a resource for N HARQ retransmissions of the data on the target logical channel, where N is a positive integer.

In some implementations, the N HARQ retransmissions may be a total number of HARQ retransmissions of the data on the target logical channel, or may be some of the HARQ retransmissions of the data on the target logical channel.

In some implementations, any one of the N+1 resources can be indicated by a prior SCI.

For example, resource 1 in the N+1 resources can be indicated by one or more SCIs transmitted prior to resource 1.

For another example, resource 2 in the N+1 resources can be indicated by one or more SCIs transmitted prior to resource 2.

In some implementations, an interval between any two adjacent resources in the N+1 resources should be not less than a first interval.

In some implementations, if a PSFCH resource is configured for a resource pool or if the first terminal device is to transmit an activated HARQ-ACK feedback, an interval between any two adjacent resources in the N+1 resources should be not less than a first interval.

In some implementations, the first interval is pre-configured or specified in a protocol, or the first interval is configured by a network device, or the first interval is determined by the first terminal device.

In some implementations of example 2, the first terminal device determines the second resource set according to a partial sensing result. If at least one of N+1 resources selected from resources in the second resource set other than resources in the first resource set cannot be indicated by a prior SCI, the first terminal device selects N+1 resources from resources which are before a remaining delay requirement corresponding to the data on the target logical channel. The N+1 resources include a resources for initial transmission of the data on the target logical channel and a resource for N HARQ retransmissions of the data on the target logical channel, where N is a positive integer.

In some implementations of example 2, the first terminal device performs partial sensing, and determines the second resource set according to a partial-sensing result. After receiving the first resource set sent by the second terminal device, the first terminal device excludes resources in the first resource set from the second resource set, and then selects, from the remaining resources, a resource for transmission of the data on the target logical channel. Specifically, the first terminal device firstly selects a time-frequency resource (namely, a resource for initial transmission of the data on the target logical channel) randomly from resources in the second resource set other than resources in the first resource set. If N HARQ retransmissions are needed for the data on the target logical channel (where N is a positive integer and N≥1) and there are additional resources in the second resource set other than resources in the first resource set, the first terminal device further selects N additional resources from resources in the second resource set other than resources in the first resource set. The first terminal device should ensure that any one of the N+1 resources selected can be indicated by the prior SCI. In addition, if a PSFCH resource is configured for a resource pool or if the first terminal device is to transmit an activated HARQ-ACK feedback, an interval between any two adjacent resources in the N+1 resources should be not less than the first interval, so as to ensure PSFCH feedback and PSFCH feedback-based retransmission. If the first terminal device cannot ensure that any one of the N+1 resources selected from resources in the second resource set other than resources in the first resource set can be indicated by the prior SCI, the first terminal device selects N+1 resources randomly from resources which are before the remaining delay requirement corresponding to the data on the target logical channel, as illustrated in FIG. 12.

It should be noted that, since the terminal may be unable to predict an arrival time of data and thus cannot perform partial sensing, by means of implementations in example 2, by sending the first resource set, a terminal performing full sensing can provide additional channel-sensing information for a terminal performing partial sensing, thereby avoiding selection of a transmission resource that may cause collision.

Example 3: the first terminal device selects a resource preferentially from a second resource set obtained through partial sensing. If resources in the second resource set are not enough, the first terminal device selects, from the first resource set, a resource for transmission of the data on the target logical channel.

In Example 3, the first resource set is a resource set for the first terminal device.

In some implementations of example 3, the first terminal device determines the second resource set according to a partial sensing result. If at least one of resources selected from the second resource set cannot be indicated by a prior SCI, the first terminal device selects, from the first resource set, N+1 resources for transmission of the data on the target logical channel, where N is a positive integer. The N+1 resources include a resource for initial transmission of the data on the target logical channel and a resource for N HARQ retransmissions of the data on the target logical channel.

In some implementations, the N HARQ retransmissions may be a total number of HARQ retransmissions of the data on the target logical channel, or may be some of the HARQ retransmissions of the data on the target logical channel.

In some implementations, any one of the N+1 resources can be indicated by a prior SCI.

For example, resource 1 in the N+1 resources can be indicated by one or more SCIs transmitted prior to resource 1.

For another example, resource 2 in the N+1 resources can be indicated by one or more SCIs transmitted prior to resource 2.

In some implementations, an interval between any two adjacent resources in the N+1 resources should be not less than a first interval.

In some implementations, if a PSFCH resource is configured for a resource pool or if the first terminal device is to transmit an activated HARQ-ACK feedback, an interval between any two adjacent resources in the N+1 resources should be not less than a first interval.

In some implementations, the first interval is pre-configured or specified in a protocol, or the first interval is configured by a network device, or the first interval is determined by the first terminal device.

In some implementations of example 3, the first terminal device determines the second resource set according to a partial sensing result. If at least one resource of resources selected from the second resource set cannot be indicated by a prior SCI and at least one of N+1 resources selected from the first resource set cannot be indicated by the prior SCI, the first terminal device selects N+1 resources from resources which are before a remaining delay requirement corresponding to the data on the target logical channel. The N+1 resources include a resource for initial transmission of the data on the target logical channel and a resource for N HARQ retransmissions of the data on the target logical channel, where N is a positive integer.

In some implementations of example 3, the first terminal device performs partial sensing, and determines the second resource set according to a partial sensing result. After receiving the first resource set sent by the second terminal device, the first terminal device firstly selects a time-frequency resource (namely, a resource for initial transmission of the data on the target logical channel) randomly from the second resource set. If N HARQ retransmissions are needed for the data on the target logical channel (where N is a positive integer and 1) and there are additional resources in the second resource set, the first terminal device further selects N additional resources from the second resource set. The first terminal device should ensure that any one of the N+1 resources selected can be indicated by the prior SCI. In addition, if a PSFCH resource is configured for a resource pool or if the first terminal device is to transmit an activated HARQ-ACK feedback, an interval between any two adjacent resources in the N+1 resources should be not less than a certain interval, so as to ensure PSFCH feedback and PSFCH feedback-based retransmission.

In some implementations of example 3, if the first terminal device cannot ensure that any one of N+1 resources selected from the second resource set can be indicated by the prior SCI, the first terminal device selects a time-frequency resource (namely, a resource for initial transmission of the data on the target logical channel) randomly from the first resource set. If N HARQ retransmissions are needed for the data on the target logical channel (where N is a positive integer and 1) and there are additional resources in the first resource set, the first terminal device further selects N additional resources from the first resource set. The first terminal device should ensure that any one of the N+1 resources selected can be indicated by the prior SCI. In addition, if a PSFCH resource is configured for a resource pool or if the first terminal device is to transmit an activated HARQ-ACK feedback, an interval between any two adjacent resources in the N+1 resources should be not less than a certain interval, so as to ensure PSFCH feedback and PSFCH feedback-based retransmission. If the first terminal device cannot ensure that any one of the N+1 resources selected from the first resource set can be indicated by the prior SCI, the first terminal device selects N+1 resources randomly from resources which are before a remaining delay requirement corresponding to the data on the target logical channel, as illustrated in FIG. 12.

It should be noted that, since the terminal may be unable to predict an arrival time of data and thus cannot perform partial sensing, by means of implementations in example 3, by sending the first resource set, a terminal performing full sensing can provide additional channel-sensing information for a terminal performing partial sensing, thereby avoiding selection of a transmission resource that may cause collision.

Example 4: the first terminal device selects a resource preferentially from a second resource set obtained through partial sensing. If resources in the second resource set are not enough, the first terminal device selects, from the first resource set, an additional resource for transmission of the data on the target logical channel.

In Example 4, the first resource set is a resource set for the first terminal device.

In some implementations of example 4, the first terminal device determines the second resource set according to a partial sensing result. Then the first terminal device selects, from the second resource set, M+1 resources for transmission of the data on the target logical channel, where the M+1 resources include a resource for initial transmission of the data on the target logical channel and a resource for M HARQ retransmissions of the data on the target logical channel, and M is a positive integer. The first terminal device selects, from the first resource set, N−M resources for transmission of the data on the target logical channel, where the N−M resources include a resource for N−M HARQ retransmissions of the data on the target logical channel, and N is a positive integer and N>M.

It should be noted that, after the M+1 resources are selected from the second resource set by the first terminal device, there is no additional resource available for selection in the second resource set.

In some implementations, the N HARQ retransmissions may be a total number of HARQ retransmissions of the data on the target logical channel, or may be some of the HARQ retransmissions of the data on the target logical channel.

In some implementations of example 4, the first terminal device determines the second resource set according to a partial sensing result. Then the first terminal device selects, from the second resource set, M+1 resources for transmission of data on the target logical channel, where the M+1 resources include a resource for initial transmission of the data on the target logical channel and a resource for M HARQ retransmissions of the data on the target logical channel, and M is a positive integer. If at least one of N−M resources selected from the first resource set cannot be indicated by a prior SCI, the first terminal device selects N−M resources from resources which are before a remaining delay requirement corresponding to the data on the target logical channel, where the N−M resources include a resource for N−M HARQ retransmissions of the data on the target logical channel, and N is a positive integer and N>M.

In some implementations of example 4, any one of the M+1 resources can be indicated by a prior SCI, and/or any one of the N−M resources can be indicated by a prior SCI.

In some implementations of example 4, an interval between any two adjacent resources in the M+1 resources should be not less than a first interval, and/or an interval between any two adjacent resources in the N−M resources should be not less than the first interval.

In some implementations of example 4, if a PSFCH resource is configured for a resource pool or if the first terminal device is to transmit an activated HARQ-ACK feedback, an interval between any two adjacent resources in the M+1 resources should be not less than a first interval, and/or an interval between any two adjacent resources in the N−M resources should be not less than the first interval.

In some implementations, the first interval is pre-configured or specified in a protocol, or the first interval is configured by a network device, or the first interval is determined by the first terminal device.

In some implementations of example 4, the first terminal device performs partial sensing, and determines the second resource set according to a partial sensing result. The first terminal device firstly selects a time-frequency resource (namely, a resource for initial transmission of the data on the target logical channel) randomly from the second resource set. If N HARQ retransmissions are needed for the data on the target logical channel (where N is a positive integer and N≥1) and there are additional resources in the second resource set, the first terminal device further selects M additional resources from the second resource set, where M is a positive integer and M<N. Any one of the M+1 resources can be indicated by a prior SCI. In addition, if a PSFCH resource is configured for a resource pool or if the first terminal device is to transmit an activated HARQ-ACK feedback, an interval between any two adjacent resources in the M+1 resources should be not less than a certain interval, so as to ensure PSFCH feedback and PSFCH feedback-based retransmission.

In addition, after receiving the first resource set sent by the second terminal device, the first terminal device further selects N−M additional resources (resources used for N−M HARQ retransmissions of the data on the target logical channel) from the first resource set. The first terminal device should ensure that any one of the N−M resources selected can be indicated by a prior SCI. In addition, if a PSFCH resource is configured for a resource pool or if the first terminal device is to transmit an activated HARQ-ACK feedback, an interval between any two adjacent resources in the N−M resources should be not less than a certain interval, so as to ensure PSFCH feedback and PSFCH feedback-based retransmission. If the first terminal device cannot ensure that any one of the N−M resources selected from the first resource set can be indicated by the prior SCI, the first terminal device selects N−M resources randomly from resources which are before a remaining delay requirement corresponding to the data on the target logical channel, as illustrated in FIG. 12.

It should be noted that, since the terminal may be unable to predict an arrival time of data and thus cannot perform partial sensing, by means of implementations in example 4, by sending the first resource set, a terminal performing full sensing can provide additional channel-sensing information for a terminal performing partial sensing, thereby avoiding selection of a transmission resource that may cause collision.

Example 5: the first terminal device selects a resource for transmission of the data on the target logical channel from a union (i. e., a target resource set) of a second resource set obtained through partial sensing and the first resource set.

In Example 5, the first resource set is a resource set for the first terminal device.

In some implementations of example 5, the first terminal device determines the second resource set according to a partial sensing result. The first terminal device determines the target resource set, where the target resource set includes some or all of resources in the first resource set and some or all of resources in the second resource set. Then the first terminal device selects, from the target resource set, a resource for initial transmission of the data on the target logical channel.

In some implementations of example 5, the first terminal device determines the second resource set according to a partial sensing result. The first terminal device determines the target resource set, where the target resource set includes some or all of resources in the first resource set and some or all of resources in the second resource set. Then the first terminal device selects, from the target resource set, N+1 resources for transmission of the data on the target logical channel, where the N+1 resources include a resource for initial transmission of the data on the target logical channel and a resource for N HARQ retransmissions of the data on the target logical channel, and N is a positive integer.

In some implementations, the N HARQ retransmissions may be a total number of HARQ retransmissions of the data on the target logical channel, or may be some of the HARQ retransmissions of the data on the target logical channel.

In some implementations, any one of the N+1 resources can be indicated by a prior SCI.

For example, resource 1 in the N+1 resources can be indicated by one or more SCIs transmitted prior to resource 1.

For another example, resource 2 in the N+1 resources can be indicated by one or more SCIs transmitted prior to resource 2.

In some implementations, an interval between any two adjacent resources in the N+1 resources should be not less than a first interval.

In some implementations, if a PSFCH resource is configured for a resource pool or if the first terminal device is to transmit an activated HARQ-ACK feedback, an interval between any two adjacent resources in the N+1 resources should be not less than a first interval.

In some implementations, the first interval is pre-configured or specified in a protocol, or the first interval is configured by a network device, or the first interval is determined by the first terminal device.

In some implementations of example 5, the first terminal device determines the second resource set according to a partial sensing result. The first terminal device determines the target resource set, where the target resource set includes some or all of resources in the first resource set and some or all of resources in the second resource set. Then, if at least one of N+1 resources selected from the target resource set cannot be indicated by a prior SCI, the first terminal device selects N+1 resources from resources which are before a remaining delay requirement corresponding to the data on the target logical channel, where the N+1 resources include a resource for initial transmission of the data on the target logical channel and a resource for N HARQ retransmissions of the data on the target logical channel, and N is a positive integer.

In some implementations of example 5, the first terminal device performs partial sensing, and determines the second resource set according to a partial sensing result. After receiving the first resource set sent by the second terminal device, the first terminal device determines the target resource set, where the target resource set includes some or all of resources in the first resource set and some or all of resources in the second resource set. Then the first terminal device selects, from the target resource set, a resource for transmission of the data on the target logical channel. Specifically, the first terminal device firstly selects a time-frequency resource (namely, a resource for initial transmission of the data on the target logical channel) randomly from the target resource set. If N HARQ retransmissions are needed for the data on the target logical channel (where N is a positive integer and N≥1) and there are additional resources in the target resource set, the first terminal device further selects N additional resources from the target resource set. The first terminal device should ensure that any one of the N+1 resources selected can be indicated by the prior SCI. In addition, if a PSFCH resource is configured for a resource pool or if the first terminal device is to transmit an activated HARQ-ACK feedback, an interval between any two adjacent resources in the N+1 resources should be not less than the first interval, so as to ensure PSFCH feedback and PSFCH feedback-based retransmission. If the first terminal device cannot ensure that any one of the N+1 resources selected from the target resource set can be indicated by the prior SCI, the first terminal device selects N+1 resources randomly from resources which are before the remaining delay requirement corresponding to the data on the target logical channel, as illustrated in FIG. 12.

It should be noted that, since the terminal may be unable to predict an arrival time of data and thus cannot perform partial sensing, by means of implementations in example 5, by sending the first resource set, a terminal performing full sensing can provide additional channel-sensing information for a terminal performing partial sensing, thereby avoiding selection of a transmission resource that may cause collision.

In some embodiments, if the first terminal device has not received the first resource set sent by the second terminal device when the remaining delay requirement corresponding to the data on the target logical channel becomes less than a third threshold, the first terminal device selects N+1 resources from resources which are before the remaining delay requirement corresponding to the data on the target logical channel, where the N+1 resources include a resource for initial transmission of the data on the target logical channel and a resource for N HARQ retransmissions of the data on the target logical channel, and N is a positive integer.

In some embodiments, the first terminal device determines the second resource set according to a partial sensing result. If the first terminal device has not received the first resource set sent by the second terminal device when the remaining delay requirement corresponding to the data on the target logical channel becomes less than a third threshold, the first terminal device selects N+1 resources from the second resource set, where the N+1 resources include a resource for initial transmission of the data on the target logical channel and a resource for N HARQ retransmissions of the data on the target logical channel, and N is a positive integer.

In some implementations, the N HARQ retransmissions may be a total number of HARQ retransmissions of the data on the target logical channel, or may be some of the HARQ retransmissions of the data on the target logical channel.

In some implementations, any one of the N+1 resources can be indicated by a prior SCI.

For example, resource 1 in the N+1 resources can be indicated by one or more SCIs transmitted prior to resource 1.

For another example, resource 2 in the N+1 resources can be indicated by one or more SCIs transmitted prior to resource 2.

In some implementations, an interval between any two adjacent resources in the N+1 resources should be not less than a first interval.

In some implementations, if a PSFCH resource is configured for a resource pool or if the first terminal device is to transmit an activated HARQ-ACK feedback, an interval between any two adjacent resources in the N+1 resources should be not less than a first interval.

In some implementations, the third threshold is pre-configured or specified in a protocol, or the third threshold is configured by a network device, or the third threshold is determined by the first terminal device.

Therefore, in embodiments of the disclosure, if the preset condition is satisfied, the first terminal device can indicate that the second terminal device is to provide the first resource set, so that the first terminal device can select a transmission resource based on the first resource set, which is possible to avoid occurrence of problems such as hidden node, half duplex, exposed node, etc. during resource selection, thereby improving reliability of resource selection.

In addition, a distance between the first terminal device and the second terminal device should satisfy a certain condition, so as to ensure validity of a sensing result of the second terminal device. The distance between the first terminal device and the second terminal device is defined based on an SL pathloss or a geographic location. In addition, if the first terminal device operates in a full channel-sensing mode, resource collision may occur with a higher probability when the terminal device selects a resource directly from the first resource set indicated by the second terminal device, and therefore, the first terminal device can select a resource directly from the first resource set only when operating in a partial sensing mode or a random resource selection mode. The first terminal device may select a transmission resource completely from the first resource set, or may select a resource from the first resource set as well as the second resource set obtained by the first terminal device through partial sensing.

Furthermore, with technical solutions of the disclosure, performance of a terminal working in a partial sensing mode or a random resource selection mode can be improved with a relatively low implementation complexity.

The method embodiments of the disclosure are described in detail above with reference to FIG. 11 to FIG. 12, and apparatus embodiments of the disclosure will be described in detail below with reference to FIG. 13 to FIG. 17. It should be understood that the apparatus embodiments and the method embodiments correspond to each other, and for similar illustrations, reference can be made to the method embodiments.

Figure 13:
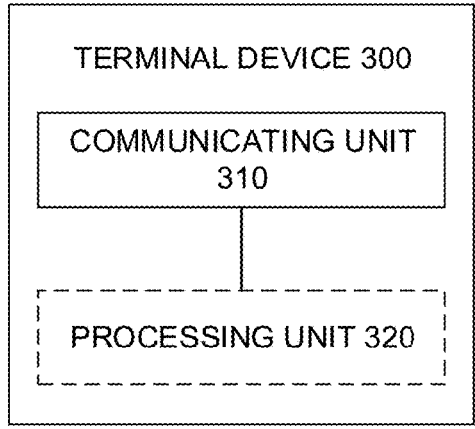
FIG. 13 is a schematic block diagram of a terminal device provided in embodiments of the disclosure.

FIG. 13 is a schematic block diagram of a terminal device 300 according to embodiments of the disclosure. As illustrated in FIG. 13, the terminal device 300 is a first terminal device. The terminal device 300 includes a communicating unit 310. The communicating unit 310 is configured to send first information to a second terminal device, where the first information indicates that the second terminal device is to provide a first resource set, and the first resource set is used for the first terminal device to select a transmission resource.

In some embodiments, the communicating unit 310 is specifically configured to send the first information to the second terminal device if a preset condition is satisfied.

In some embodiments, the preset condition includes at least one of: an SL pathloss between the first terminal device and the second terminal device is less than a first threshold, a distance between the first terminal device and the second terminal device is less than a second threshold, the first terminal device and the second terminal device are located in the same zone or adjacent zones, a resource pool used by the first terminal device allows random resource selection, the first terminal device is performing random resource selection or partial sensing-based resource selection, or the first terminal device does not have a channel sensing result when resource reselection is triggered.

In some embodiments, the SL pathloss is determined according to an SL RSRP of the first terminal device measured and reported by the second terminal device.

In some embodiments, the first threshold is pre-configured or specified in a protocol, or the first threshold is configured by a network device, or the first threshold is determined by the first terminal device.

In some embodiments, the second threshold is pre-configured or specified in a protocol, or the second threshold is configured by a network device, or the second threshold is determined by the first terminal device.

In some embodiments, the size of the zone is pre-configured or specified in a protocol, or the size of the zone is configured by a network device.

In some embodiments, the preset condition is pre-configured or specified in a protocol, or the preset condition is configured by a network device.

In some embodiments, the first information includes at least one of: a percentage of remaining resources, a physical-layer priority of data to be transmitted by the first terminal device, a remaining tolerable delay of the data to be transmitted by the first terminal device, a resource reservation interval for the data to be transmitted by the first terminal device, or a frequency-domain size of a transmission resource for the first terminal device.

In some embodiments, the first information includes indication information, and the indication information indicates whether the first terminal device is to select a transmission resource from the first resource set.

In some embodiments, the communicating unit 310 is further configured to receive the first resource set sent by the second terminal device. The terminal device 300 further includes a processing unit 320. The processing unit 320 is configured to select, based on the first resource set, a resource for transmission of data on a target logical channel.

In some embodiments, the processing unit 320 is specifically configured to: select, from the first resource set, a resource for initial transmission of the data on the target logical channel; or select, from the first resource set, N+1 resources for transmission of the data on the target logical channel, where the N+1 resources include a resource for initial transmission of the data on the target logical channel and a resource for N HARQ retransmissions of the data on the target logical channel, and N is a positive integer.

In some embodiments, the processing unit 320 is specifically configured to: determine a second resource set according to a partial sensing result, and perform one of: selecting, from resources in the second resource set other than resources in the first resource set, a resource for initial transmission of the data on the target logical channel; or selecting, from resources in the second resource set other than resources in the first resource set, N+1 resources for transmission of the data on the target logical channel, where the N+1 resources include a resource for initial transmission of the data on the target logical channel and a resource for N HARQ retransmissions of the data on the target logical channel, and N is a positive integer.

In some embodiments, the processing unit 320 is specifically configured to: determine a second resource set according to a partial sensing result, and select, from the first resource set, N+1 resources for transmission of the data on the target logical channel if at least one of resources selected from the second resource set cannot be indicated by a prior SCI, where the N+1 resources include a resource for initial transmission of the data on the target logical channel and a resource for N HARQ retransmissions of the data on the target logical channel, and N is a positive integer.

In some embodiments, the processing unit 320 is specifically configured to: determine a second resource set according to a partial sensing result. The processing unit 320 is configured to determine a target resource set, where the target resource set includes some or all of resources in the first resource set and some or all of resources in the second resource set. The processing unit 320 is configured to perform one of: selecting, from the target resource set, a resource for initial transmission of the data on the target logical channel; or selecting, from the target resource set, N+1 resources for transmission of the data on the target logical channel, where the N+1 resources include a resource for initial transmission of the data on the target logical channel and a resource for N HARQ retransmission of the data on the target logical channel, and N is a positive integer.

In some embodiments, any one of the N+1 resources can be indicated by a prior SCI.

In some embodiments, the processing unit 320 is specifically configured to: select N+1 resources from resources which are before a remaining delay requirement corresponding to the data on the target logical channel, if at least one of N+1 resources selected from the first resource set cannot be indicated by a prior SCI, where the N+1 resources include a resource for initial transmission of the data on the target logical channel and a resource for N HARQ retransmissions of the data on the target logical channel, and N is a positive integer.

In some embodiments, the processing unit 320 is specifically configured to: determine a second resource set according to a partial sensing result; and select N+1 resources from resources which are before a remaining delay requirement corresponding to the data on the target logical channel, if at least one resource of N+1 resources selected from resources in the second resource set other than resources in the first resource set cannot be indicated by a prior SCI, where the N+1 resources include a resource for initial transmission of the data on the target logical channel and a resource for N HARQ retransmissions of the data on the target logical channel, and N is a positive integer.

In some embodiments, the processing unit 320 is specifically configured to: determine a second resource set according to a partial sensing result; and select N+1 resources from resources which are before a remaining delay requirement corresponding to the data on the target logical channel, if at least one of resources selected from the second resource set cannot be indicated by a prior SCI and at least one of N+1 resources selected from the first resource set cannot be indicated by a prior SCI, where the N+1 resources include a resource for initial transmission of the data on the target logical channel and a resource for N HARQ retransmissions of the data on the target logical channel, and N is a positive integer.

In some embodiments, the processing unit 320 is specifically configured to determine a second resource set according to a partial sensing result. The processing unit 320 is configured to determine a target resource set, where the target resource set includes some or all of resources in the first resource set and some or all of resources in the second resource set. The processing unit 320 is configured to select N+1 resources from resources which are before a remaining delay requirement corresponding to the data on the target logical channel, if at least one of N+1 resources selected from the target resource set cannot be indicated by a prior SCI, where the N+1 resources include a resource for initial transmission of the data on the target logical channel and a resource for N HARQ retransmissions of the data on the target logical channel, and N is a positive integer.

In some embodiments, the terminal device 300 further includes a processing unit 320. The processing unit 320 is configured to select N+1 resources from resources which are before a remaining delay requirement corresponding to a data on a target logical channel, if the first terminal device has not received the first resource set sent by the second terminal device when the remaining delay requirement corresponding to the data on the target logical channel becomes less than a third threshold, where the N+1 resources include a resource for initial transmission of the data on the target logical channel and a resource for N HARQ retransmissions of the data on the target logical channel, and N is a positive integer.

In some embodiments, the terminal device 300 further includes a processing unit 320. The processing unit 320 is configured to determine a second resource set according to a partial sensing result; and select N+1 resources from the second resource set, if the first terminal device has not received the first resource set sent by the second terminal device when a remaining delay requirement corresponding to a data on a target logical channel becomes less than a third threshold, where the N+1 resources include a resource for initial transmission of the data on the target logical channel and a resource for N HARQ retransmissions of the data on the target logical channel, and N is a positive integer.

In some embodiments, an interval between any two adjacent resources in the N+1 resources is not less than a first interval.

In some embodiments, the interval between any two adjacent resources in the N+1 resources is not less than the first interval if a PSFCH resource is configured for a resource pool or if the first terminal device is to transmit an activated HARQ-ACK feedback.

In some embodiments, the processing unit 320 is specifically configured to determine a second resource set according to a partial sensing result. The processing unit 320 is configured to select, from the second resource set, M+1 resources for transmission of the data on the target logical channel, where the M+1 resources include a resource for initial transmission of the data on the target logical channel and a resource for M HARQ retransmissions of the data on the target logical channel, and M is a positive integer. The processing unit 320 is configured to select, from the first resource set, N−M resources for transmission of the data on the target logical channel, where the N−M resources include a resource for N−M HARQ retransmissions of the data on the target logical channel, and N is a positive integer and N>M.

In some embodiments, the processing unit 320 is specifically configured to determine a second resource set according to a partial sensing result. The processing unit 320 is configured to select, from the second resource set, M+1 resources for transmission of the data on the target logical channel, where the M+1 resources include a resource for initial transmission of the data on the target logical channel and a resource for M HARQ retransmissions of the data on the target logical channel, and M is a positive integer. The processing unit 320 is configured to select N−M resources from resources which are before a remaining delay requirement corresponding to the data on the target logical channel, if at least one of N−M resources selected from the first resource set cannot be indicated by a prior SCI, where the N−M resources include a resource for N−M HARQ retransmissions of the data on the target logical channel, and N is a positive integer and N>M.

In some embodiments, any one of the M+1 resources can be indicated by a prior SCI, and/or any one of the N−M resources can be indicated by a prior SCI.

In some embodiments, an interval between any two adjacent resources in the M+1 resources is not less than a first interval, and/or an interval between any two adjacent resources om the N−M resources is not less than the first interval.

In some embodiments, the interval between any two adjacent resources in the M+1 resources is not less than the first interval, and/or the interval between any two adjacent resources in the N−M resources is not less than the first interval, if a PSFCH resource is configured for a resource pool or if the first terminal device is to transmit an activated HARQ-ACK feedback.

In some embodiments, the communicating unit may be a communication interface or a transceiver, or may be an input/output interface of a communication chip or a system-on-chip (SOC). The processing unit may be one or more processors.

It should be understood that, the terminal device 300 according to embodiments of the disclosure may correspond to the first terminal device in the method embodiments of the disclosure, and the foregoing and other operations and/or functions of various units in the terminal device 300 are respectively intended for implementing corresponding procedures of the first terminal device in the method 200 illustrated in FIG. 11, which will not be described in detail again herein for brevity.

Figure 14:
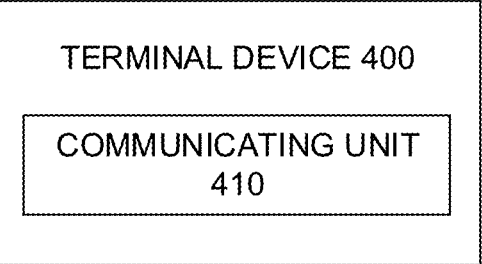
FIG. 14 is a schematic block diagram of another terminal device provided in embodiments of the disclosure.

FIG. 14 is a schematic block diagram of a terminal device 400 according to embodiments of the disclosure. As illustrated in FIG. 14, the terminal device 400 is a second terminal device, and the terminal device 400 includes a communicating unit 410. The communicating unit 410 is configured to receive first information sent by a first terminal device, where the first information indicates that the second terminal device is to provide a first resource set, and the first resource set is used for the first terminal device to select a transmission resource.

In some embodiments, the first information includes at least one of: a percentage of remaining resources, a physical-layer priority of data to be transmitted by the first terminal device, a remaining tolerable delay of the data to be transmitted by the first terminal device, a resource reservation interval for the data to be transmitted by the first terminal device, or a frequency-domain size of a transmission resource for the first terminal device.

In some embodiments, the first information includes indication information, and the indication information indicates whether the first terminal device is to select a transmission resource from the first resource set.

In some embodiments, the communicating unit 410 is further configured to send the first resource set to the first terminal device.

In some embodiments, the communicating unit may be a communication interface or a transceiver, or may be an input/output interface of a communication chip or an SOC.

It should be understood that, the terminal device 400 according to embodiments of the disclosure may correspond to the second terminal device in the method embodiments of the disclosure, and the foregoing and other operations and/or functions of various units in the terminal device 400 are respectively intended for implementing corresponding procedures of the second terminal device in the method 200 illustrated in FIG. 11, which will not be described in detail again herein for brevity.

Figure 15:
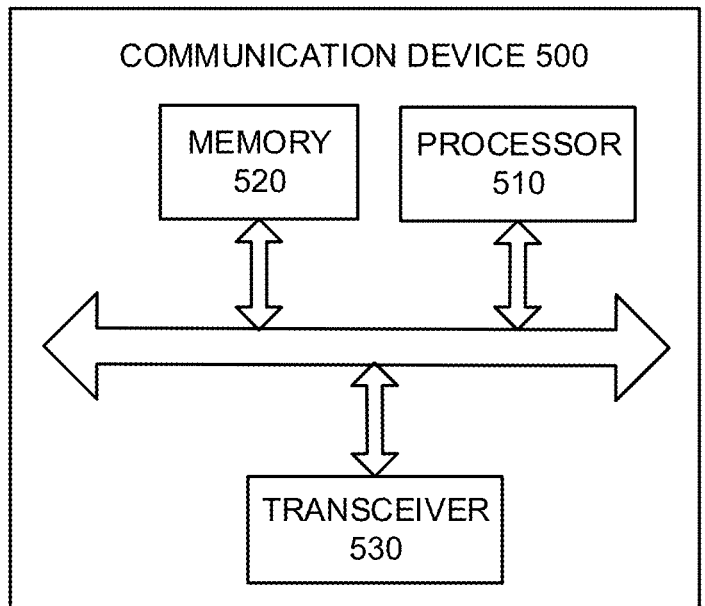
FIG. 15 is a schematic block diagram of a communication device provided in embodiments of the disclosure.

FIG. 15 is a schematic structural diagram of a communication device 500 provided in embodiments of the disclosure. The communication device 500 illustrated in FIG. 15 includes a processor 510. The processor 510 can invoke and execute computer programs stored in a memory, to implement the method in embodiments of the disclosure.

In some embodiments, as illustrated in FIG. 15, the communication device 500 may further include a memory 520, where the processor 510 can invoke and execute computer programs stored in the memory 520, to implement the method in embodiments of the disclosure.

The memory 520 may be a separate device independent of the processor 510, or may be integrated into the processor 510.

In some embodiments, as illustrated in FIG. 15, the communication device 500 may further include a transceiver 530. The processor 510 can control the transceiver 530 to communicate with other devices, and specifically, to send information or data to other devices or receive information or data sent by other devices.

The transceiver 530 may include a transmitter and a receiver. The transceiver 530 can further include an antenna, where one or more antennas may be provided.

In some embodiments, the communication device 500 may specifically be the first terminal device in embodiments of the disclosure, and the communication device 500 may implement corresponding operations implemented by the first terminal device in various methods in embodiments of the disclosure, which will not be described again herein for the sake of brevity.

In some embodiments, the communication device 500 may specifically be the second terminal device in embodiments of the disclosure, and the communication device 500 may implement corresponding operations implemented by the second terminal device in various methods in embodiments of the disclosure, which will not be described again herein for the sake of brevity.

Figure 16:
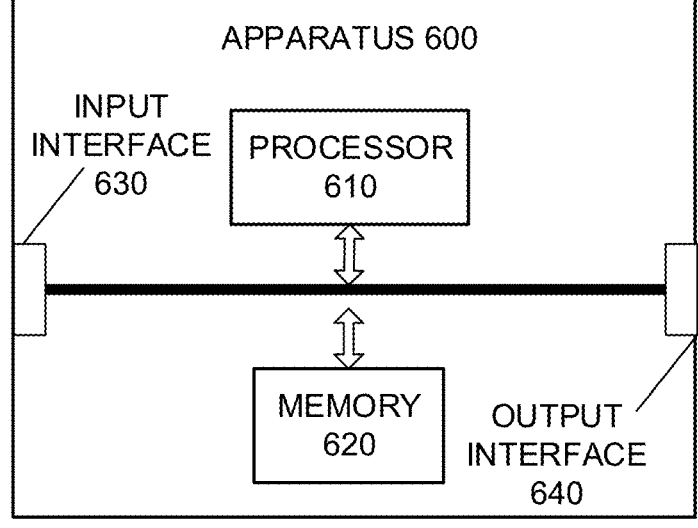
FIG. 16 is a schematic block diagram of an apparatus provided in embodiments of the disclosure.

FIG. 16 is a schematic structural diagram of an apparatus according to embodiments of the disclosure. The apparatus 600 illustrated in FIG. 16 includes a processor 610. The processor 610 can invoke and execute computer programs stored in a memory, so as to implement the method in embodiments of the disclosure.

In some embodiments, as illustrated in FIG. 16, the apparatus 600 may further include a memory 620. The processor 610 can invoke and execute computer programs stored in the memory 620, so as to implement the method in embodiments of the disclosure.

The memory 620 may be a separate device independent of the processor 610, or may be integrated into the processor 610.

In some embodiments, the apparatus 600 may further include an input interface 630. The processor 610 can control the input interface 630 to communicate with other devices or chips, and specifically, to obtain information or data sent by other devices or chips.

In some embodiments, the apparatus 600 may further include an output interface 640. The processor 610 can control the output interface 640 to communicate with other devices or chips, and specifically, to output information or data to other devices or chips.

In some embodiments, the apparatus may be applied to the first terminal device in embodiments of the disclosure, and the apparatus may implement corresponding operations implemented by the first terminal device in various methods in embodiments of the disclosure, which will not be described again herein for the sake of brevity.

In some embodiments, the apparatus may be applied to the second terminal device in embodiments of the disclosure, and the apparatus may implement corresponding operations implemented by the second terminal device in various methods in embodiments of the disclosure, which will not be described again herein for the sake of brevity.

In some embodiments, the apparatus in embodiments of the disclosure may also be a chip, for example, an SOC.

Figure 17:
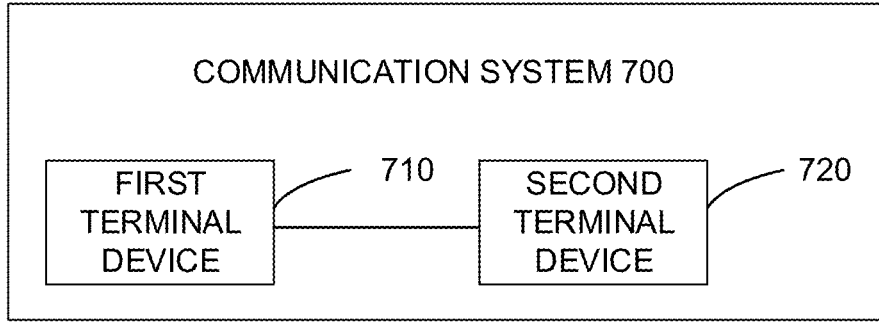
FIG. 17 is a schematic block diagram of a communication system provided in embodiments of the disclosure.

FIG. 17 is a schematic block diagram of a communication system 700 provided in embodiments of the disclosure. As illustrated in FIG. 17, the communication system 700 includes a first terminal device 710 and a second terminal device 720.

The first terminal device 710 may be configured to implement corresponding functions implemented by the first terminal device in the foregoing methods, and the second terminal device 720 may be configured to implement corresponding functions implemented by the second terminal device in the foregoing methods, which will not be described again herein for the sake of brevity.

It should be understood that, the processor in embodiments of the disclosure may be an integrated circuit chip with signal processing capabilities. During implementation, each step of the foregoing method embodiments may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in embodiments of the disclosure can be implemented or executed. The general-purpose processor may be a microprocessor, or the processor may be any conventional processor or the like. The steps of the method disclosed in embodiments of the disclosure may be directly implemented by a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware of the processor.

It can be understood that, the memory in embodiments of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES-DRAM), a synchlink DRAM (SLDRAM), and a direct rambus RAM (DR RAM). It should be noted that, the memory of the systems and methods described in the disclosure is intended to include, but is not limited to, these and any other suitable types of memory.

It should be understood that, the memory above is intended for illustration rather than limitation. For example, the memory in embodiments of the disclosure may also be an SRAM, a DRAM, an SDRAM, a DDR SDRAM, an ESDRAM, an SLDRAM, a DR RAM, etc. In other words, the memory in embodiments of the disclosure is intended to include, but is not limited to, these and any other suitable types of memory.

Embodiments of the disclosure further provide a computer-readable storage medium. The computer-readable storage medium is configured to store computer programs.

In some embodiments, the computer-readable storage medium may be applied to the first terminal device in embodiments of the disclosure, and the computer programs are operable with a computer to execute corresponding operations implemented by the first terminal device in various methods in embodiments of the disclosure, which will not be described again herein for the sake of brevity.

In some embodiments, the computer-readable storage medium may be applied to the second terminal device in embodiments of the disclosure, and the computer programs are operable with a computer to execute corresponding operations implemented by the second terminal device in various methods in embodiments of the disclosure, which will not be described again herein for the sake of brevity.

Embodiments of the disclosure further provide a computer program product. The computer program product includes computer program instructions.

In some embodiments, the computer program product may be applied to the first terminal device in embodiments of the disclosure, and the computer program instructions are operable with a computer to execute corresponding operations implemented by the first terminal device in various methods in embodiments of the disclosure, which will not be described again herein for the sake of brevity.

In some embodiments, the computer program product may be applied to the second terminal device in embodiments of the disclosure, and the computer program instructions are operable with a computer to execute corresponding operations implemented by the second terminal device in various methods in embodiments of the disclosure, which will not be described again herein for the sake of brevity.

Embodiments of the disclosure further provide a computer program.

In some embodiments, the computer program may be applied to the first terminal device in embodiments of the disclosure. The computer program, when executed by a computer, is operable to implement corresponding operations implemented by the first terminal device in various methods in embodiments of the disclosure, which will not be described again herein for the sake of brevity.

In some embodiments, the computer program may be applied to the second terminal device in embodiments of the disclosure. The computer program, when executed by a computer, is operable to implement corresponding operations implemented by the second terminal device in various methods in embodiments of the disclosure, which will not be described again herein for the sake of brevity.

Those of ordinary skill in the art will appreciate that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and brevity, in terms of the specific working processes of the foregoing systems, apparatuses, and units, reference can be made to the corresponding processes in the foregoing method embodiments, which will not be repeated herein.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various embodiments of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computer device, e.g., a personal computer, a server, a network device, etc., to execute some or all operations of the methods described in various embodiments of the disclosure. The above storage medium may include various kinds of media that can store program codes, such as a universal serial bus (USB) flash disk, a mobile hard drive, a ROM, a RAM, a magnetic disk, or an optical disk.

The foregoing elaborations are merely implementations of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

We claim:

1. A wireless communication method, comprising:
sending, by a first terminal device, first information to a second terminal device, wherein the first information indicates that the second terminal device is to provide a first resource set, and the first resource set is used for the first terminal device to select a transmission resource;
receiving, by the first terminal device, the first resource set sent by the second terminal device; and
selecting from the first resource set, by the first terminal device, N+1 resources for transmission of data on a target logical channel, wherein the N+1 resources comprise a resource for initial transmission of the data on the target logical channel and a resource for N hybrid automatic repeat request (HARQ) retransmissions of the data on the target logical channel, and N is a positive integer, wherein the first resource set is a resource set for the first terminal device;
wherein any one of the N+1 resources can be indicated by a prior SCI, and an interval between any two adjacent resources in the N+1 resources is not less than a first interval when a physical sidelink feedback channel (PSFCH) resource is configured for a resource pool or when the first terminal device is to transmit an activated HARQ-acknowledgement (HARQ-ACK) feedback.

2. The method of claim 1, wherein sending, by the first terminal device, the first information to the second terminal device comprises:
sending, by the first terminal device, the first information to the second terminal device if a preset condition is satisfied, wherein the preset condition is pre-configured or specified in a protocol, or the preset condition is configured by a network device.

3. The method of claim 1, wherein the first information comprises at least one of:
a percentage of remaining resources;
a physical-layer priority of data to be transmitted by the first terminal device;
a remaining tolerable delay of the data to be transmitted by the first terminal device;
a resource reservation interval for the data to be transmitted by the first terminal device; and
a frequency-domain size of a transmission resource for the first terminal device.

4. The method of claim 1, wherein selecting based on the first resource set, by the first terminal device, the resource for transmission of the data on the target logical channel comprises:
determining, by the first terminal device, a second resource set according to a partial sensing result;
determining, by the first terminal device, a target resource set, wherein the target resource set comprises some or all of resources in the first resource set and some or all of resources in the second resource set; and selecting from the target resource set, by the first terminal device, N+1 resources for transmission of the data on the target logical channel, wherein the N+1 resources comprise a resource for initial transmission of the data on the target logical channel and a resource for N HARQ retransmissions of the data on the target logical channel, and N is a positive integer.

5. The method of claim 1, wherein the first terminal device is in a random resource selection mode, or the first terminal device does not have a channel sensing result.

6. The method of claim 1, further comprising:
not performing, by the first terminal device, any channel sensing after sending the first information.

7. The method of claim 1, wherein selecting based on the first resource set, by the first terminal device, the resource for transmission of the data on the target logical channel comprises:
determining, by the first terminal device, a second resource set according to a partial sensing result; and
performing one of:
selecting from resources in the second resource set other than resources in the first resource set, by the first terminal device, a resource for initial transmission of the data on the target logical channel; or
selecting from resources in the second resource set other than resources in the first resource set, by the first terminal device, N+1 resources for transmission of the data on the target logical channel, wherein the N+1 resources comprise a resource for initial transmission of the data on the target logical channel and a resource for N HARQ retransmissions of the data on the target logical channel, and N is a positive integer.

8. A wireless communication method, comprising:
receiving, by a second terminal device, first information sent by a first terminal device, wherein the first information indicates that the second terminal device is to provide a first resource set, and the first resource set is used for the first terminal device to select a transmission resource;
wherein N+1 resources for transmission of data on a target logical channel will be selected by the first terminal device, wherein the N+1 resources comprise a resource for initial transmission of the data on the target logical channel by the first terminal device and a resource for N hybrid automatic repeat request (HARQ) retransmissions of the data on the target logical channel by the first terminal device, and N is a positive integer, wherein the first resource set is a resource set for the first terminal device;
wherein any one of the N+1 resources can be indicated by a prior SCI, and an interval between any two adjacent resources in the N+1 resources is not less than a first interval when a physical sidelink feedback channel (PSFCH) resource is configured for a resource pool or when the first terminal device is to transmit an activated HARQ-acknowledgement (HARQ-ACK) feedback.

9. The method of claim 8, further comprising:
sending, by the second terminal device, the first resource set to the first terminal device.

10. A terminal device, being operable as a first terminal device and comprising:
a memory configured to store computer programs;
a transceiver; and
a processor configured to execute the computer programs stored in the memory to:

cause the transceiver to send first information to a second terminal device, wherein the first information indicates that the second terminal device is to provide a first resource set, and the first resource set is used for the first terminal device to select a transmission resource;

cause the transceiver to receive the first resource set sent by the second terminal device; and select N+1 resources for transmission of data on a target logical channel, wherein the N+1 resources comprise a resource for initial transmission of the data on the target logical channel and a resource for N hybrid automatic repeat request (HARQ) retransmissions of the data on the target logical channel, and N is a positive integer, wherein the first resource set is a resource set for the first terminal device;

wherein any one of the N+1 resources can be indicated by a prior SCI, and an interval between any two adjacent resources in the N+1 resources is not less than a first interval when a physical sidelink feedback channel (PSFCH) resource is configured for a resource pool or when the first terminal device is to transmit an activated HARQ-acknowledgement (HARQ-ACK) feedback.

11. The terminal device of claim 10, wherein the transceiver is specifically configured to:

send the first information to the second terminal device if a preset condition is satisfied, wherein the preset condition is pre-configured or specified in a protocol, or the preset condition is configured by a network device.

12. The terminal device of claim 11, wherein the processor is specifically configured to:

determine a second resource set according to a partial sensing result; and perform one of:

selecting, from resources in the second resource set other than resources in the first resource set, a resource for initial transmission of the data on the target logical channel; or selecting, from resources in the second resource set other than resources in the first resource set, N+1 resources for transmission of the data on the target logical channel, wherein the N+1 resources comprise a resource for initial transmission of the data on the target logical channel and a resource for N HARQ retransmissions of the data on the target logical channel, and N is a positive integer.

13. The terminal device of claim 11, wherein the processor configured to select based on the first resource set, the resource for transmission of the data on the target logical channel is configured to:

determine a second resource set according to a partial sensing result;

determine a target resource set, wherein the target resource set comprises some or all of resources in the first resource set and some or all of resources in the second resource set; and select from the target resource set N+1 resources for transmission of the data on the target logical channel, wherein the N+1 resources comprise a resource for initial transmission of the data on the target logical channel and a resource for N HARQ retransmissions of the data on the target logical channel, and N is a positive integer.

14. The terminal device of claim 10, wherein the first information comprises at least one of:

a percentage of remaining resources;

a physical-layer priority of data to be transmitted by the first terminal device;

a remaining tolerable delay of the data to be transmitted by the first terminal device;

a resource reservation interval for the data to be transmitted by the first terminal device; and a frequency-domain size of a transmission resource for the first terminal device.

15. The terminal device of claim 10, wherein the first terminal device is in a random resource selection mode, or the first terminal device does not have a channel sensing result.

16. The terminal device of claim 10, wherein the processor is configured not to perform any channel sensing after sending the first information.

* * * * *